US008899926B2

(12) United States Patent
Garcia

(10) Patent No.: US 8,899,926 B2
(45) Date of Patent: Dec. 2, 2014

(54) COUNTER ROTATING FACEGEAR GEARBOX

(75) Inventor: Todd A. Garcia, Mansfield, TX (US)

(73) Assignee: Sikorsky Aircraft Corporation, Stratford, CT (US)

( * ) Notice: Subject to any disclaimer, the term of this patent is extended or adjusted under 35 U.S.C. 154(b) by 777 days.

(21) Appl. No.: 13/022,405

(22) Filed: Feb. 7, 2011

(65) Prior Publication Data

US 2011/0194935 A1   Aug. 11, 2011

Related U.S. Application Data

(60) Provisional application No. 61/301,866, filed on Feb. 5, 2010.

(51) Int. Cl.
| *B64C 27/10* | (2006.01) |
| *B64C 27/12* | (2006.01) |
| *B64D 35/00* | (2006.01) |
| *F16H 1/20* | (2006.01) |
| *F16H 37/06* | (2006.01) |

(52) U.S. Cl.
CPC .............. *B64D 35/00* (2013.01); *F16H 37/065* (2013.01); *B64C 27/12* (2013.01); *F16H 1/203* (2013.01)
USPC ...................................... 416/129; 416/170 R

(58) Field of Classification Search
USPC ............ 416/120, 170 R, 90 A, 124, 128, 129, 416/130, 172; 74/412 R, 665 G, 665 GB
See application file for complete search history.

(56) References Cited

U.S. PATENT DOCUMENTS

| 2,770,149 | A | * | 11/1956 | Losey | 74/665 S |
| 4,489,625 | A | * | 12/1984 | White | 74/665 C |
| 5,135,442 | A | * | 8/1992 | Bossler, Jr. | 475/1 |
| 5,472,386 | A |   | 12/1995 | Kish | |
| 5,802,918 | A | * | 9/1998 | Chen et al. | 74/416 |
| 5,807,202 | A | * | 9/1998 | Sammataro | 475/336 |
| 5,813,292 | A |   | 9/1998 | Kish et al. | |

(Continued)

FOREIGN PATENT DOCUMENTS

| FR | 920127 | 3/1947 |
| FR | 1473407 | 3/1967 |

OTHER PUBLICATIONS

Notification of Transmittal of the European Search Report for European Searching Authority, or the Declaration; Application No. EP 11 15 3395; Nov. 26, 2013.

*Primary Examiner* — Edward Look
*Assistant Examiner* — William Grigos
(74) *Attorney, Agent, or Firm* — Cantor Colburn LLP

(57) ABSTRACT

A gearbox assembly includes a first face gear driveable about a face gear axis in a first direction by at least one first pinion gear and a second face gear driveable about the face gear axis in a second direction opposite the first direction by at least one second pinion gear. A thrust bearing is located between the first face gear and the second face gear. The first face gear is configured to drive rotation of a first shaft in the first direction and the second face gear is configured to drive rotation of a second shaft in the second direction. Further disclosed is a power train for a rotary wing aircraft having a gearbox including a first face gear rotatable in a first direction and a second face gear rotatable in a second direction opposite the first direction.

18 Claims, 5 Drawing Sheets

(56) References Cited

U.S. PATENT DOCUMENTS

| | | |
|---|---|---|
| 5,823,470 A | 10/1998 | Craig et al. |
| 5,941,124 A | 8/1999 | Tan |
| 6,260,430 B1 | 7/2001 | Andrei |
| 6,428,443 B1 * | 8/2002 | Dischler .................. 475/343 |
| 6,612,195 B2 | 9/2003 | Gmirya et al. |
| 7,100,468 B2 | 9/2006 | Gmirya et al. |
| 7,413,142 B2 * | 8/2008 | Gmirya ...................... 244/60 |
| 8,015,900 B2 * | 9/2011 | Gmirya ................. 74/665 GA |
| 2004/0211278 A1 * | 10/2004 | Gmirya et al. ............ 74/410 |
| 2004/0214682 A1 | 10/2004 | Sbabo |
| 2006/0266883 A1 | 11/2006 | Gmirya |

\* cited by examiner

_US 8,899,926 B2_

COUNTER ROTATING FACEGEAR GEARBOX

CROSS-REFERENCE TO RELATED APPLICATIONS

This application claims priority to provisional application 61/301,866 filed on Feb. 5, 2010, the contents of which are incorporated by reference herein in their entirety.

BACKGROUND OF THE INVENTION

The subject matter disclosed herein relates to drive trains. More specifically, the subject disclosure relates to gearboxes for rotary-wing aircraft.

Rotary-wing aircraft require a gearbox to transfer power from the engine or engines to the rotary wing. Since the desired rotational velocity of the rotor is lower than that of the engine, the rotational velocity transferred from the engine to the rotor must be reduced in the gearbox via a gear reduction system. The velocity reduction is accomplished via one or more intermediate gears between the engine and an output gear which drives the rotor. The rotational velocity reduction via these intermediate gears also increases a torque transferred to the output gear, so that the output gear size must be increased to withstand the torque applied. In some rotary-wing aircraft, especially ones with two counter-rotating rotors, the resulting gearbox is large and heavy. For example, some gearboxes for such aircraft have two separate output bull gears, driven by a pair of pinions connected to the bull gears by a spiral bevel mesh. The two bull gears and ancillary components take up considerable space and result in a heavy gearbox. Since both space and weight are at a premium in any aircraft, the art would favorably receive a rotary ring aircraft gearbox which has improvements in size and weight.

BRIEF DESCRIPTION OF THE INVENTION

According to one aspect of the invention, a gearbox assembly includes a first face gear driveable about a face gear axis in a first direction by at least one first pinion gear and a second face gear driveable about the face gear axis in a second direction opposite the first direction by at least one second pinion gear. A thrust bearing is located between the first face gear and the second face gear. The first face gear is configured to drive rotation of a first shaft in the first direction and the second face gear is configured to drive rotation of a second shaft in the second direction.

According to another aspect of the invention, a gearbox for a rotary wing aircraft includes a first face gear driveable about a face gear axis in a first direction by at least one first pinion gear and a second face gear driveable about the face gear axis in a second direction opposite the first direction by at least one second pinion gear. A thrust bearing is located between the first face gear and the second face gear. The first face gear is configured to drive rotation of a first rotor in the first direction and the second face gear is configured to drive rotation of a second rotor in the second direction.

According to yet another aspect of the invention, a powertrain for a rotary wing aircraft includes at least one engine having an engine shaft. The powertrain further includes a gearbox having a first face gear operably connected to the engine shaft driveable about a face gear axis in a first direction by at least one first pinion gear and a second face gear operably connected to the engine shaft driveable about the face gear axis in a second direction opposite the first direction by at least one second pinion gear. A thrust bearing is located between the first face gear and the second face gear. A first rotor is connected to the first face gear and thereby rotatable in the first direction and a second rotor is connected to the second face gear and thereby rotatable in the second direction.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
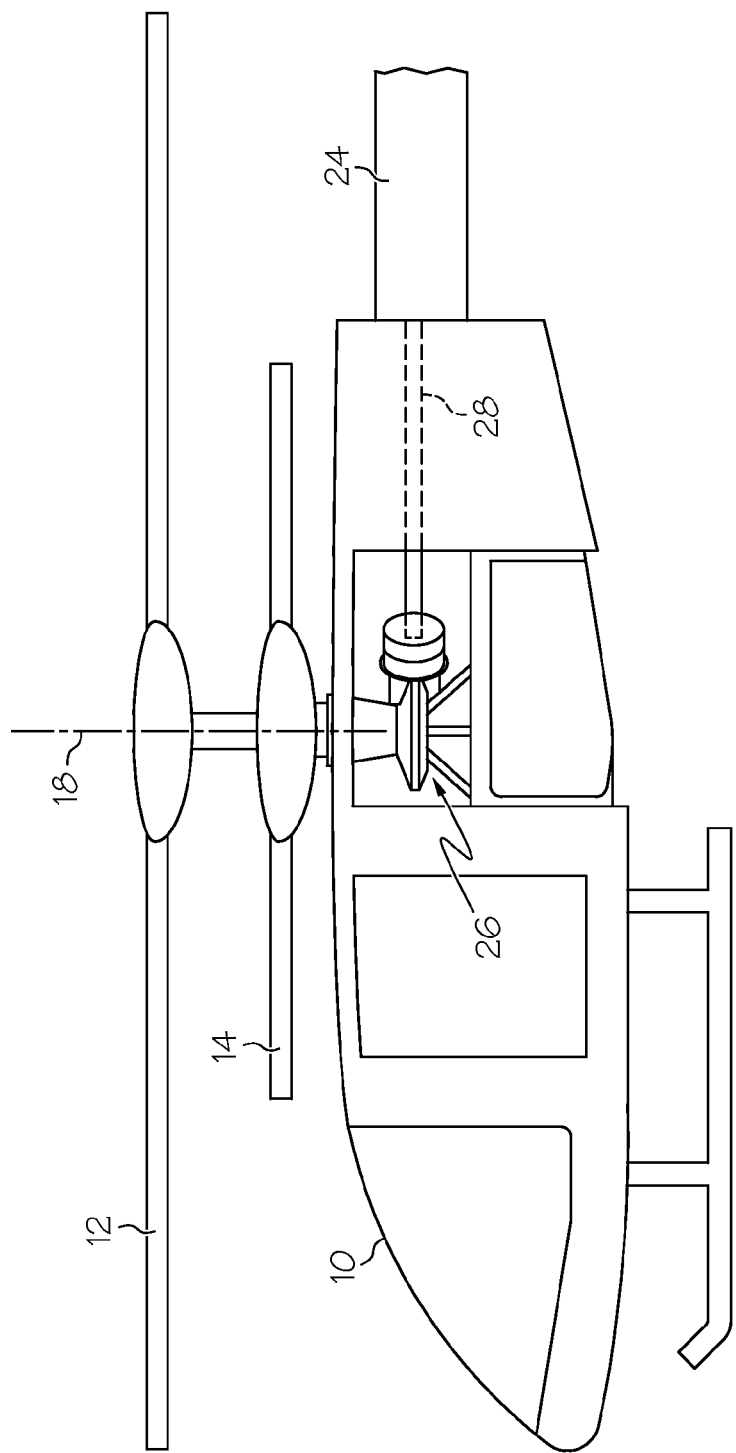
FIG. 1 is a schematic view of an embodiment of a rotary wing aircraft.

Shown in FIG. 1 is a cross-sectional view of a rotary wing aircraft 10. The aircraft 10 includes an upper rotor 12 and a lower rotor 14, which in some embodiments is configured to rotate in a direction opposite to the rotation of the upper rotor 12 about a rotor axis 18. The upper rotor 12 and lower rotor 14 are driven by an upper rotor shaft 20 and lower rotor shaft 22 (shown in FIG. 4). One or more engines 24 supply power to the upper rotor shaft 20 and lower rotor shaft 22 via a gearbox 26. The gearbox 26 is configured to transfer rotation of an engine shaft 28 into rotation of the upper rotor shaft 20 and lower rotor shaft 22 and to also provide speed reduction from a rotational speed of the engine shaft 28 to a desired rotation speed of the upper rotor shaft 20 and lower rotor shaft 22.

Figure 2:
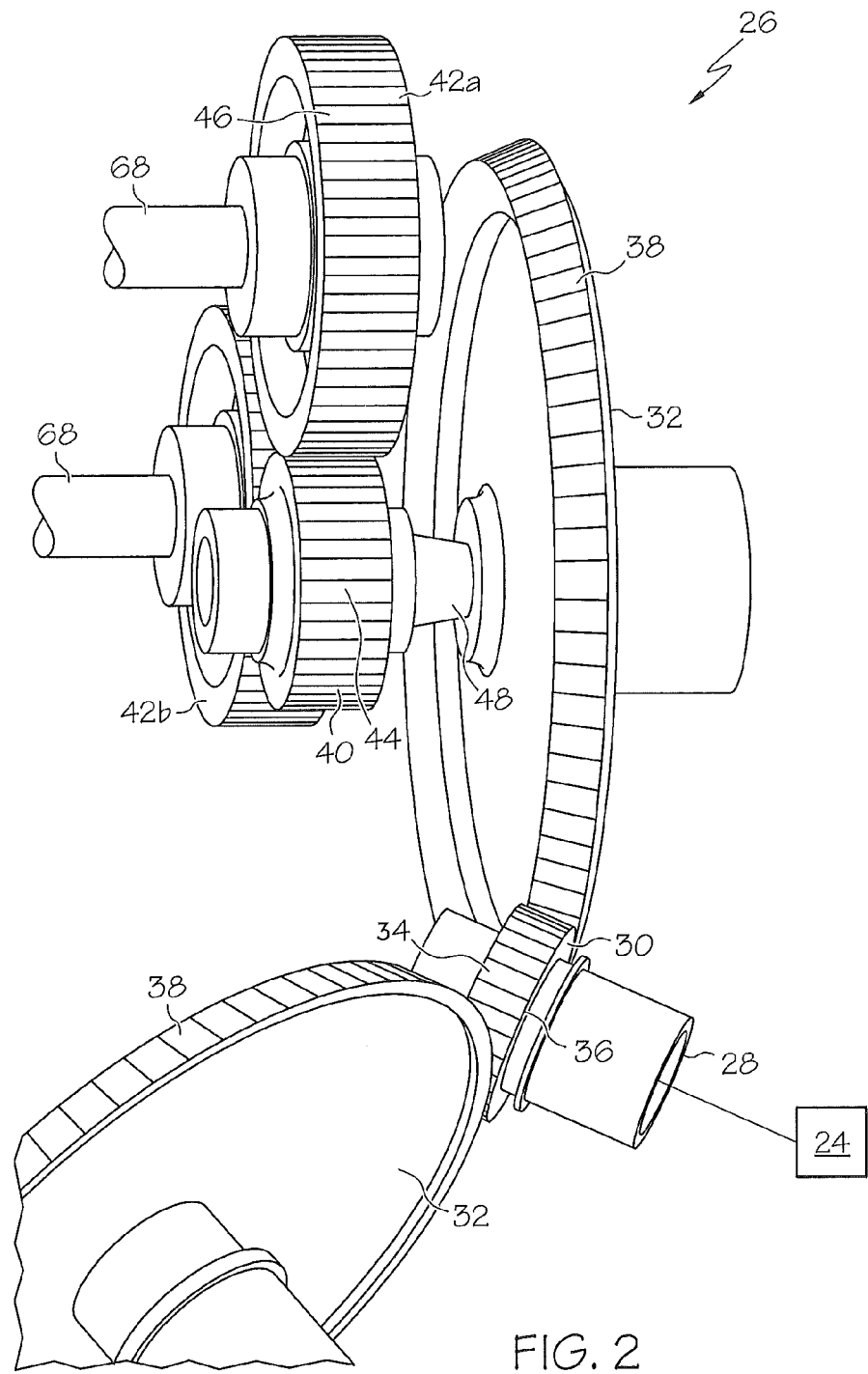
FIG. 2 is a partial schematic view of an embodiment of a gearbox.

Referring now to FIG. 2, shown is a schematic view of an embodiment of a gearbox 26. The gearbox 26 is connected to the engine 24 via the engine shaft 28. The engine shaft 28 includes an engine shaft gear 30 disposed at one end to drive two first reduction gears 32 which, in some embodiments, are disposed at opposing sides of the engine shaft gear 30. Engine shaft gear teeth 34 disposed at an outer periphery 36 of the engine shaft gear 30 mesh with first reduction gear teeth 38 thus splitting a torque transmitted through the engine shaft 28. Further, the first reduction gears 32 have a larger diameter than the engine shaft gear 30 to reduce a rotational speed of the system. In some embodiments, the engine shaft gear 30 and/or the first reduction gears 32 are beveled to enable improved meshing therebetween.

Each first reduction gear 32 includes a first reduction output gear 40 which transfers rotational energy of the first reduction gear 32 to one or more second reduction gears 42 via a plurality of first reduction output teeth 44. The output gear 40 is connected the first reduction gear 32 via a torsionally compliant member 48, such as a torsional spring, which allows for some absorption of torque between the output gear 40 and the first reduction gear 32. The plurality of first reduction output teeth 44 mesh with a plurality of second reduction gear teeth 46 to drive rotation of the one or more second reduction gears 42. In the embodiment shown in FIG. 2, each first reduction output gear 40 drives two second reduction gears 42, an upper second reduction gear 42a and a lower second reduction gear 42b.

Figure 3:
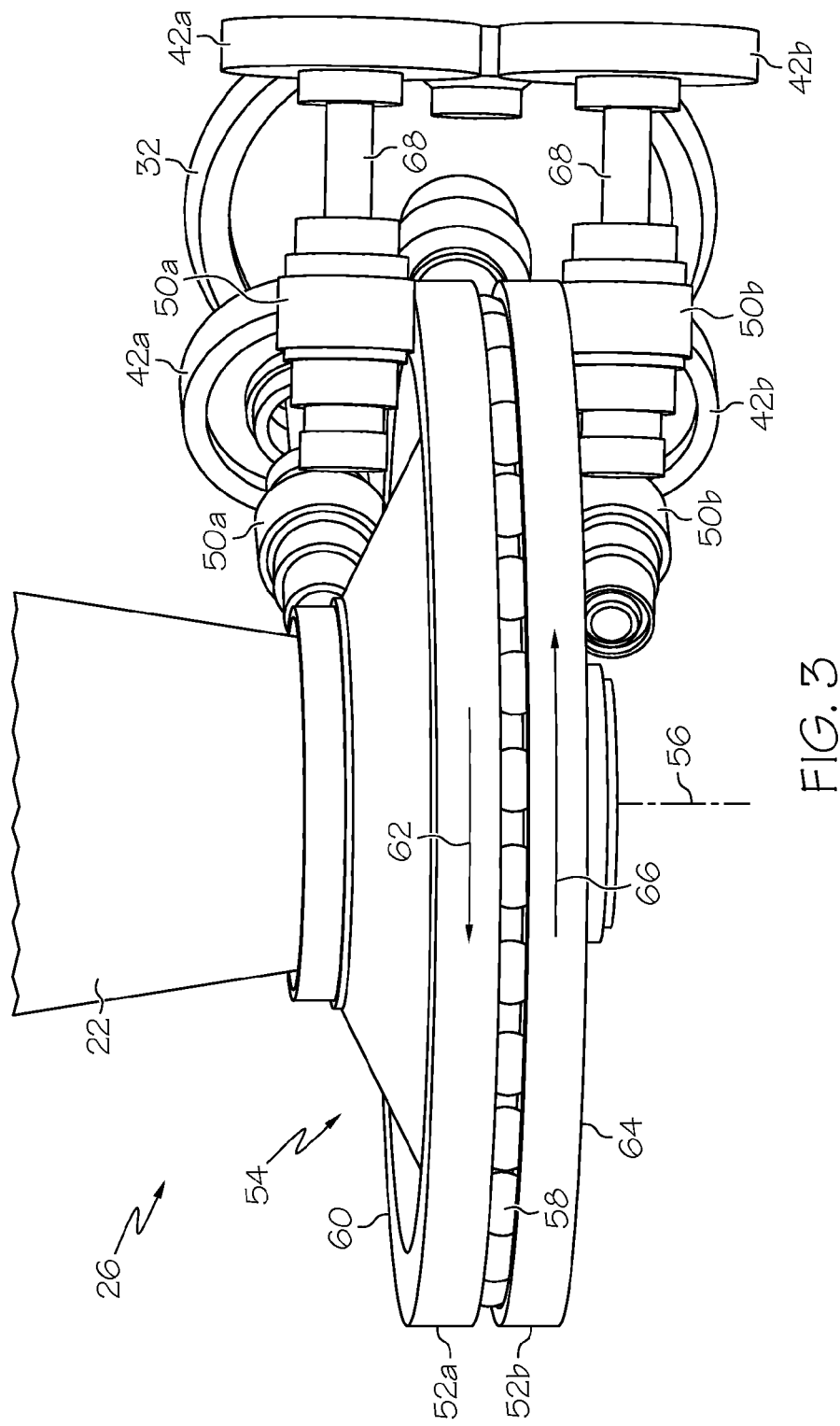
FIG. 3 is another partial schematic of an embodiment of a gearbox.

Referring now to FIG. 3, each second reduction gear 42 includes a pinion shaft 68 extending axially therefrom. A pinion gear 50 is secured to each pinion shaft 68 such that rotation of the second reduction gear 42 rotates the pinion gear 50. Each pinion gear 50 rotates in the same direction as its associated second reduction gear 42, upper pinion gear 50a associated with upper second reduction gear 42a and lower pinion gear 50b associated with lower second reduction gear 42b. Each pinion gear 50 meshes with a face gear 52 of a face gear assembly 54. The face gear assembly 54 includes two face gears 52 stacked along face gear axis 56 with a thrust bearing 58 disposed between a first face gear 52a and a second face gear 52b. In some embodiments, the first face gear 52a and the second face gear 52b are coaxial. The upper pinion gears 50a mesh with a first side 60 of the first face gear 52a to drive the first face gear 52a in a first direction 62 about the face gear axis 56. Similarly, the lower pinion gears 50b mesh with a second side 64 of the second face gear 52b to drive the second face gear 52b in a second direction 66 about the face gear axis 56, where the first direction 62 is opposite the second direction 66.

Figure 4:
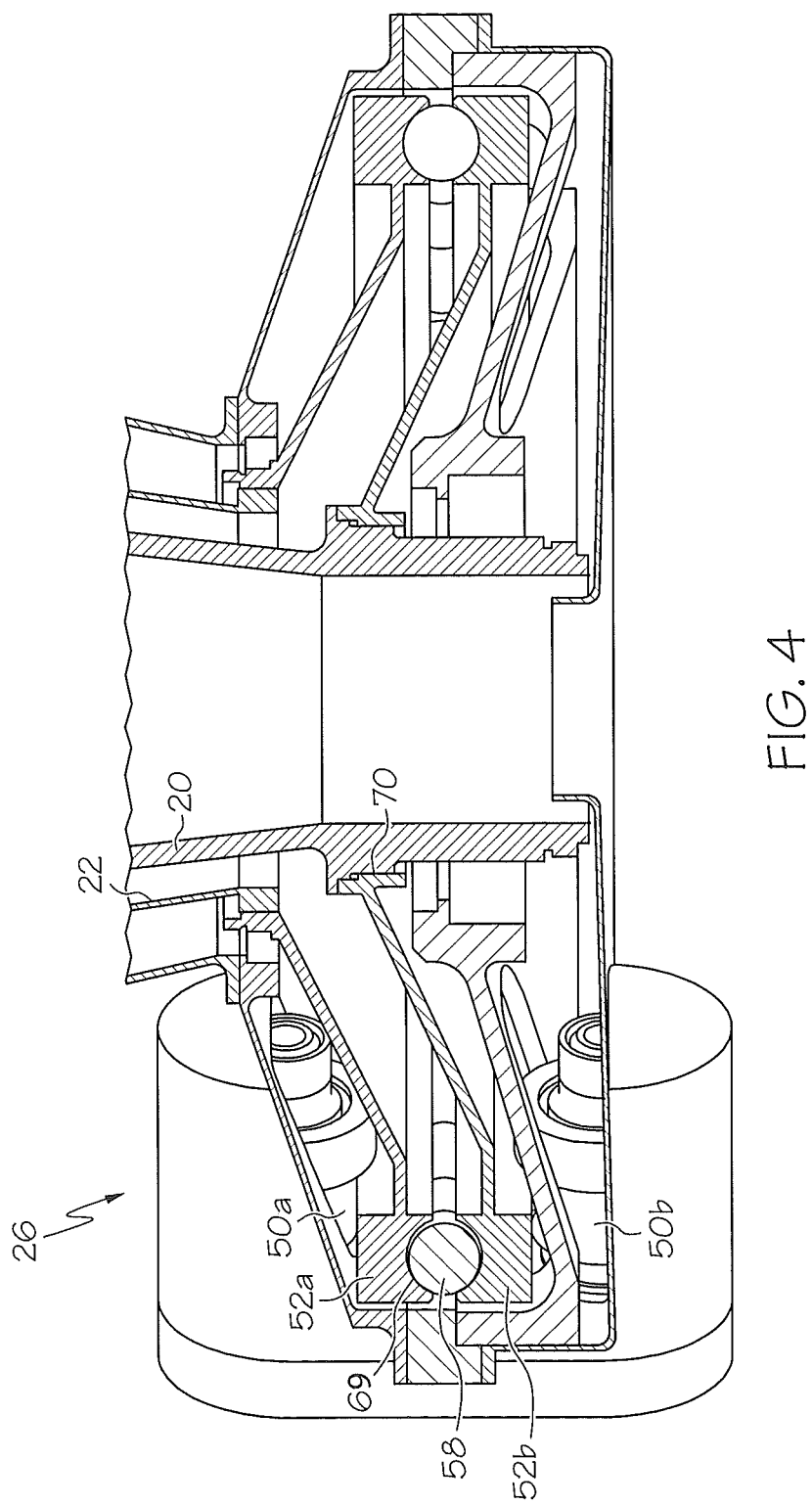
FIG. 4 is a cross-sectional view of an embodiment of a gearbox.

The placement of the thrust bearing 58 between the first face gear 52a and the second face gear 52b permits the counter-rotation of the first face gear 52a and the second face gear 52b. The thrust bearing 58 extends circumferentially between the first face gear 52a and second face gear 52b and may comprise ball elements, cylindrical elements, air, and/or film lubricant or other suitable bearing elements to allow the counter-rotation. In some embodiments, as illustrated in FIG. 4, the face gear assembly 54 is preloaded to retain the thrust bearing 58 in a desired location. Essentially, the first face gear 52a and the second face gear 52b are urged toward each other to retain the thrust bearing 58 in a bearing cavity 68 between the first face gear 52a and the second face gear 52b.

Referring again to FIG. 3, multiple pinion gears 50 may be utilized to drive each of the face gears 52. The embodiment of FIG. 3 utilizes two pinion gears 50 to drive each face gear 52, but other quantities of pinion gears 50 may be utilized. Using multiple pinion gears 50 provides redundancy in the event of problems with or failure of a pinion gear 50, and also through torque splitting reduces a torque applied by each pinion gear 50 thus reducing stresses in the gearbox 26. It is to be appreciated, however, that if such redundancy is not necessary or desired, a single pinion gear 50 may be utilized to drive rotation of each face gear 52.

As shown in FIG. 4, the upper rotor shaft 20 is connected to the second face gear 52b via, for example, a spline connection 70 such that rotation of the second face gear 52b drives rotation of the upper rotor shaft 20. Similarly, the lower rotor shaft 22 is secured to the first face gear 52a such that rotation of the first face gear 52a drives rotation of the lower rotor shaft 22. Since the face gears 52a and 52b are rotating in opposite directions, the upper rotor shaft 20 and lower rotor shaft 22 will likewise rotate in opposite directions.

Figure 5:
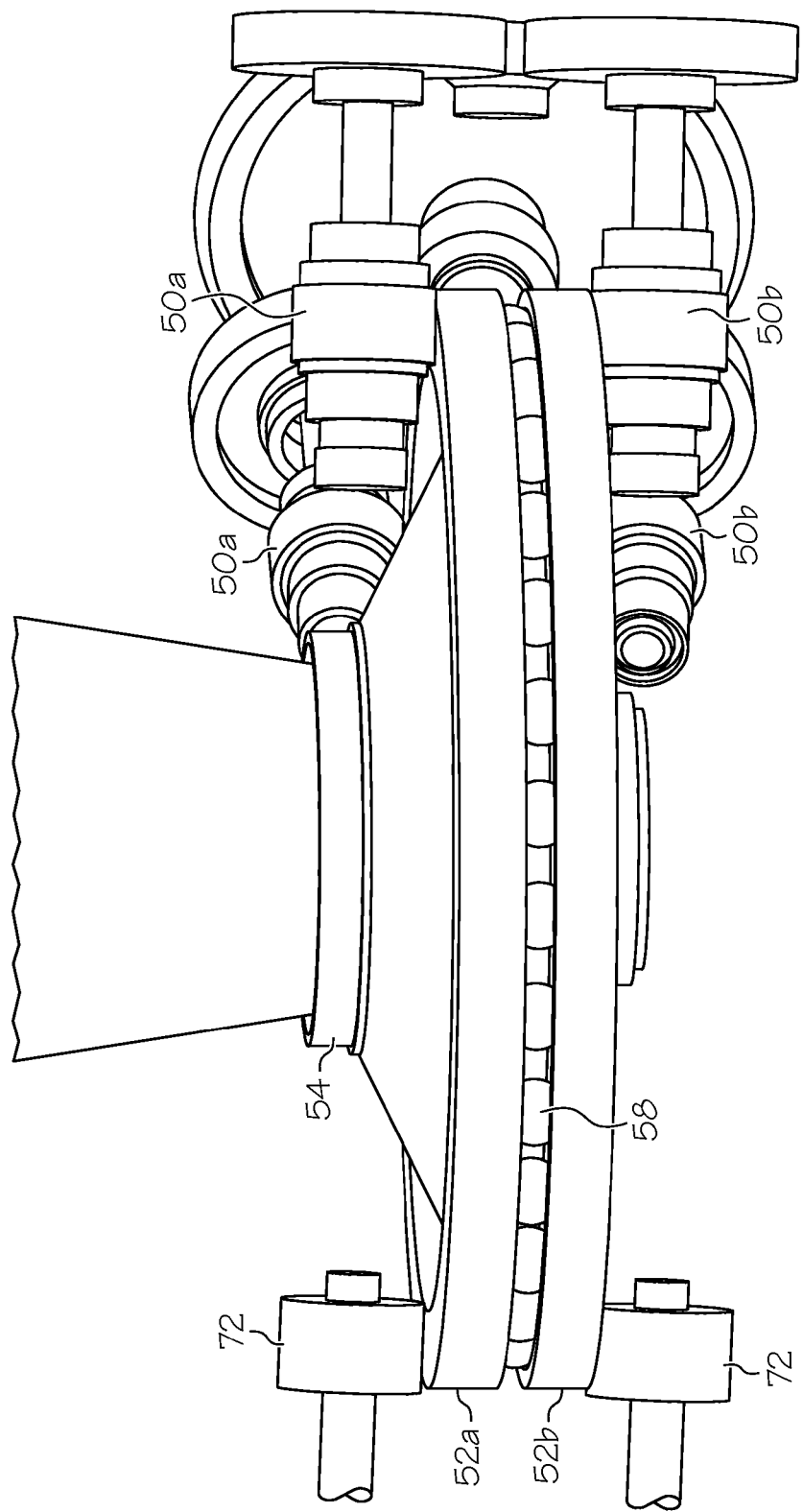
FIG. 5 is a partial schematic of another embodiment of a gearbox.

Referring now to FIG. 5, in some embodiments one or more power take-offs 72 are located at the face gear assembly 54. The power take offs 72 may be to provide power to a tail rotor or other accessories. In some embodiments, the power take offs 72 are located circumferentially at locations around the face gear assembly 54 to prevent distortion or rippling of the face gear assembly 54.

The embodiments of the gearbox 26 shown in the FIGs utilize rotational energy from one engine 24. It is to be appreciated, however, that the gearbox 26 may be adapted to utilize power from multiple engines 24 through, for example, the provision of more than one engine shaft 28. Further, two levels of torque split and gear reduction are provided by the first reduction gears 32 and second reduction gears 40. If additional torque splitting and/or gear reduction is necessary, more reduction gears, for example, third and/or fourth reduction gears, may be utilized.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A gearbox assembly comprising:
   a first face gear driveable about a face gear axis in a first direction by at least one first pinion gear;
   a second face gear driveable about the face gear axis in a second direction opposite the first direction by at least one second pinion gear; and
   a thrust bearing disposed between the first face gear and the second face gear;
   wherein the first face gear is configured to drive rotation of a first shaft in the first direction and the second face gear is configured to drive rotation of a second shaft in the second direction.

2. The gearbox of claim 1 wherein the at least one first pinion gear and the at least one second pinion gear are operably connected to and driven by at least one first reduction gear.

3. The gearbox of claim 2 wherein the at least one first reduction gear is operably connected to at least one input shaft.

4. The gearbox of claim 2 wherein the at least one first pinion gear and the at least one second pinion gear are each operably connected to the at least one first reduction gear via a second reduction gear.

5. The gearbox of claim 1 wherein the first face gear includes a spline to connect the first face gear to the first shaft.

6. The gearbox of claim 1 wherein the second face gear includes a spline to connect the second face gear to the second shaft.

7. A gearbox for a rotary wing aircraft comprising:
   a first face gear driveable about a face gear axis in a first direction by at least one first pinion gear;
   a second face gear driveable about the face gear axis in a second direction opposite the first direction by at least one second pinion gear; and
   a thrust bearing disposed between the first face gear and the second face gear;
   wherein the first face gear is configured to drive rotation of a first rotor in the first direction and the second face gear is configured to drive rotation of a second rotor in the second direction.

8. The gearbox of claim 7 wherein the at least one first pinion gear and the at least one second pinion gear are operably connected to and driven by at least one first reduction gear.

9. The gearbox of claim 8 wherein the at least one first reduction gear is operably connected to at least one input shaft.

10. The gearbox of claim 8 wherein the at least one first pinion gear and the at least one second pinion gear are each operably connected to the at least one first reduction gear via a second reduction gear.

11. The gearbox of claim 7 wherein the first face gear includes a spline to connect the first face gear to the first shaft.

12. The gearbox of claim 7 wherein the second face gear includes a spline to connect the second face gear to the second shaft.

13. A powertrain for a rotary wing aircraft comprising:
at least one engine having an engine shaft;
a gearbox including:
a first face gear operably connected to the engine shaft driveable about a face gear axis in a first direction by at least one first pinion gear;
a second face gear operably connected to the engine shaft driveable about the face gear axis in a second direction opposite the first direction by at least one second pinion gear; and
a thrust bearing disposed between the first face gear and the second face gear;
a first rotor connected to the first face gear and thereby rotatable in the first direction; and
a second rotor connected to the second face gear and thereby rotatable in the second direction.

14. The power train of claim 13 wherein the at least one first pinion gear and the at least one second pinion gear are operably connected to and driven by at least one first reduction gear.

15. The power train of claim 14 wherein the at least one first reduction gear is operably connected to at least one input shaft.

16. The power train of claim 14 wherein the at least one first pinion gear and the at least one second pinion gear are each operably connected to the at least one first reduction gear via a second reduction gear.

17. The power train of claim 13 wherein the first face gear includes a spline to connect the first face gear to the first rotor.

18. The power train of claim 13 wherein the second face gear includes a spline to connect the second face gear to the second rotor.

* * * * *